United States Patent
Jeong et al.

(10) Patent No.: US 9,296,929 B2
(45) Date of Patent: Mar. 29, 2016

(54) OPTICAL MEMBER AND DISPLAY APPARATUS INCLUDING THE SAME

(71) Applicants: Woo Jin Jeong, Uiwang-si (KR); Da Hee Lee, Uiwang-si (KR); Yi Eun Kim, Uiwang-si (KR); Yoo Jin Suh, Uiwang-si (KR)

(72) Inventors: Woo Jin Jeong, Uiwang-si (KR); Da Hee Lee, Uiwang-si (KR); Yi Eun Kim, Uiwang-si (KR); Yoo Jin Suh, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 558 days.

(21) Appl. No.: 13/692,095

(22) Filed: Dec. 3, 2012

(65) Prior Publication Data

US 2013/0141786 A1 Jun. 6, 2013

(30) Foreign Application Priority Data

Dec. 1, 2011 (KR) .................. 10-2011-0127935

(51) Int. Cl.
| | |
|---|---|
| *C09K 19/00* | (2006.01) |
| *C09J 133/06* | (2006.01) |
| *G02B 5/30* | (2006.01) |
| *C09J 133/12* | (2006.01) |

(52) U.S. Cl.
CPC .............. *C09J 133/06* (2013.01); *C09J 133/12* (2013.01); *G02B 5/30* (2013.01); *G02B 5/3033* (2013.01); *Y10T 428/1059* (2015.01); *Y10T 428/1077* (2015.01)

(58) Field of Classification Search
CPC ....... G02B 5/30; G02B 5/3033; C09J 133/06; C09J 133/12; G06F 3/045; G02F 1/13338; G02F 1/133528; Y10T 428/105; Y10T 428/1059; Y10T 428/1077
USPC .......................... 428/1.3, 1.54, 1.55; 156/60; 359/485.01, 483.01
See application file for complete search history.

(56) References Cited

U.S. PATENT DOCUMENTS

| | | | |
|---|---|---|---|
| 2006/0062938 A1 | 3/2006 | Takeko et al. | |
| 2009/0142517 A1 | 6/2009 | Takeko et al. | |
| 2009/0168169 A1* | 7/2009 | Jeong et al. | .................. 359/485 |

FOREIGN PATENT DOCUMENTS

| | | |
|---|---|---|
| CN | 1757664 A | 4/2006 |
| CN | 1900748 A | 1/2007 |
| CN | 1993633 A | 7/2007 |
| JP | 2011-153169 A | 8/2011 |

(Continued)

OTHER PUBLICATIONS

Office Action mailed Aug. 22, 2014 in corresponding Chinese Patent Application No. 201210511139.3.

(Continued)

*Primary Examiner* — Ruiyun Zhang
(74) *Attorney, Agent, or Firm* — Lee & Morse, P.C.

(57) ABSTRACT

An optical member, an optical adhesive, and a display apparatus, the optical member including a transparent conductive film; an optical adhesive layer on the transparent conductive film; and a polarizer plate stacked on the optical adhesive layer, wherein a surface resistance difference Rs2–Rs1 of a specimen including the optical adhesive layer is less than about 0.2Ω, the specimen being prepared by manufacturing the polarizer plate having the optical adhesive layer thereon and stacking two transparent conductive films on opposite upper sides of the optical adhesive layer, where Rs1 is an initial surface resistance of the specimen and Rs2 is a surface resistance of the specimen kept at 70° C. and 95% RH for 48 hours.

18 Claims, 1 Drawing Sheet

(56) References Cited

FOREIGN PATENT DOCUMENTS

| | | | |
|---|---|---|---|
| JP | 2011153169 A | * | 8/2011 |
| KR | 2011-0125480 A | | 11/2011 |

OTHER PUBLICATIONS

Taiwanese Office Action for 101145244 dated Jun. 5, 2015; Jeong, et al.

* cited by examiner

OPTICAL MEMBER AND DISPLAY APPARATUS INCLUDING THE SAME

CROSS-REFERENCE TO RELATED APPLICATION

The present application claims priority under 35 U.S.C. §119 to Korean Patent Application No. 10-2011-0127935, filed on Dec. 1, 2011, in the Korean Intellectual Property Office, and entitled: "Optical Member and Display Apparatus Including the Same," which is incorporated by reference herein in its entirety.

BACKGROUND

1. Field

Embodiments relate to an optical member and a display apparatus including the same.

2. Description of the Related Art

A display apparatus including a liquid crystal display with a polarizer plate and a retardation film stacked thereon may be easily deformed under an external environment. In particular, when exposed to light, the display apparatus may suffer from light leakage. Light leakage may occur due to optical anisotropy resulting from contraction of a stretched polarizing film under high temperature and humidity conditions.

SUMMARY

Embodiments are directed to an optical member and a display apparatus including the same.

Embodiments may be realized by providing an optical member including a transparent conductive film; an optical adhesive layer on the transparent conductive film; and a polarizer plate stacked on the optical adhesive layer, wherein a surface resistance difference Rs2−Rs1 of a specimen including the optical adhesive layer is less than about 0.2Ω, the specimen being prepared by manufacturing the polarizer plate having the optical adhesive layer thereon and stacking two transparent conductive films on opposite upper sides of the optical adhesive layer, where Rs1 is an initial surface resistance of the specimen and Rs2 is a surface resistance of the specimen kept at 70° C. and 95% RH for 48 hours.

A surface resistance difference Rs3−Rs1 of the specimen may be less than about 0.2Ω, where Rs3 is a surface resistance of the specimen kept at 60° C. and 95% RH for 500 hours.

The optical adhesive layer may have an index of refraction of about 1.48 to about 1.50, as measured on a film having a thickness of about 10 μm to about 50 μm.

The optical adhesive layer may have a loss modulus G" of about 1.0E+04 to about 2.0E+04 dyne/cm$^2$, as measured at a thickness of 25 μm at 25° C. and 1 Hz.

The optical adhesive layer may have a ratio (G'/G") of storage modulus G' to loss modulus G" of about 1 to about 6, as measured at a thickness of 25 μm at 25° C. and 1 Hz.

The optical adhesive layer may include a (meth)acrylic copolymer, the (meth)acrylic copolymer having an acid value of less than about 0.5 mgKOH/g and a weight average molecular weight of about 800,000 to about 2,000,000 g/mol.

The (meth)acrylic copolymer may include repeating units of a monomer selected from the group of an aromatic ring containing vinyl monomer, an alicyclic ring containing vinyl monomer, a pyrrolidonyl group containing vinyl monomer, a furyl group containing monomer, and a mixture thereof.

The monomer may have an index of refraction of about 1.47 or more.

The repeating units of the monomer may be present in an amount of about 0.01 to about 30 wt % in the (meth)acrylic copolymer.

The copolymer may include the repeating units of the aromatic ring containing vinyl monomer, the aromatic ring containing vinyl monomer being represented by Formula 1 or 2:

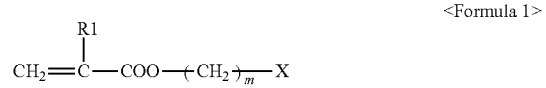

<Formula 1> wherein, in Formula 1, R1 is hydrogen or a C1-C5 alkyl group, m is an integer from about 0 to 10, and X is selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, and a benzylphenyl group,

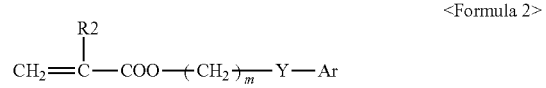

<Formula 2> wherein, in Formula 2, R2 is hydrogen or a C1-C5 alkyl group, in is an integer from about 0 to 10, Y is oxygen or sulfur, and Ar is selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, and a benzylphenyl group.

The (meth)acrylic copolymer may include repeating units of (A) a monomer selected from an aromatic ring containing vinyl monomer, an alicyclic ring containing vinyl monomer, a pyrrolidonyl group containing vinyl monomer, a furyl group containing monomer, and a mixture thereof, (B) an alkyl group containing vinyl monomer, (C) a hydroxyl group containing vinyl monomer, and (D) a carboxylic acid group containing vinyl monomer.

The repeating units of the (D) monomer may be present in an amount of about 0.1 to about 4.9 wt % in the (meth)acrylic copolymer.

The (meth)acrylic copolymer may include about 0.01 to about 30 wt % of repeating units of the (A) monomer, about 50 to about 90 wt % of repeating units of the (B) monomer, about 0.1 to about 20 wt % of repeating units of the (C) monomer, and about 0.1 to about 4.9 wt % of repeating units of the (D) monomer.

The optical adhesive layer may further include at least one curing agent selected from the group of an isocyanate curing agent and an epoxy curing agent.

The curing agent may be present in an amount of about 0.01 to about 10 parts by weight, based on 100 parts by weight of the (meth)acrylic copolymer.

The optical adhesive layer may further include a silane coupling agent, the silane coupling agent being present in an amount of about 0.01 to about 0.5 parts by weight, based on 100 parts by weight of the (meth)acrylic copolymer.

The transparent conductive film may be a film or a grid electrode film including at least one selected from the group of tin oxide, indium oxide, indium tin oxide, indium zinc oxide, indium zirconium oxide, zirconium oxide, fluorine tin oxide, zinc oxide, cadmium tin oxide, sulfur oxide, fluorine oxide, carbon black, carbon nanotube, platinum, gold, silver, palladium, electrically conductive polymer, and a mixture thereof.

The transparent conductive film may be stacked on a glass substrate or a polyethylene terephthalate (PET) substrate.

Embodiments may also be realized by providing an optical adhesive including a (meth)acrylic copolymer, wherein the optical adhesive has an index of refraction from about 1.48 to about 1.50, as measured on a film having a thickness of about 10 μm to 50 μm, and wherein a surface resistance difference Rs2−Rs1 of a specimen including the optical adhesive is less than about 0.2Ω, the specimen being prepared by manufacturing a polarizer plate having a cured product of the optical adhesive thereon and stacking two transparent conductive films on opposite upper sides of the cured product, where Rs1 is an initial surface resistance of the specimen and Rs2 is a surface resistance of the specimen kept at 70° C. and 95% RH for 48 hours.

Embodiments may also be realized by providing a display apparatus comprising the optical member according to an embodiment.

BRIEF DESCRIPTION OF DRAWINGS

Features will become apparent to those of ordinary skill in the art by describing in detail exemplary embodiments with reference to the attached drawings in which.

DETAILED DESCRIPTION

Figure 1:
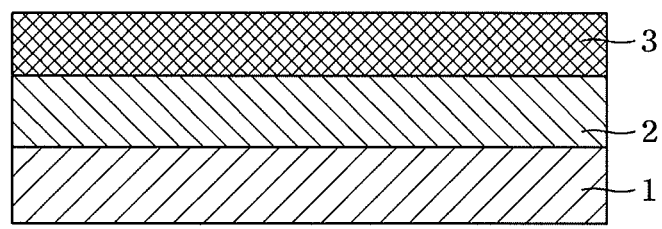
FIG. 1 illustrates a side sectional view of an optical member according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In an embodiment, an optical member may include an optical adhesive layer. The optical adhesive layer may make a specimen that includes the optical adhesive layer have a surface resistance difference Rs2−Rs1 of less than about 0.2Ω. For example, when the specimen including the optical adhesive layer is prepared by manufacturing a polarizer plate having the optical adhesive layer thereon and stacking two transparent conductive films on opposite upper sides or ends of the optical adhesive layer, the specimen may have a surface resistance difference Rs2−Rs1 of less than about 0.2Ω, where Rs1 is an initial surface resistance of the specimen and Rs2 is a surface resistance of the specimen kept at 70° C. and 95% RH for 48 hours.

In order to apply an optical adhesive layer to a touch screen panel (TSP), the optical adhesive layer may be brought into contact with a transparent conductive film including an ITO film or the like. The optical adhesive layer may help suppress corrosion of the transparent conductive film.

When the surface resistance difference Rs2−Rs1 is less than about 0.2Ω, as measured by a corrosion evaluation method, the optical adhesive layer attached to the transparent conductive film may help reduce and/or prevent corrosion of the transparent conductive film. In an implementation, the surface resistance difference Rs2−Rs1 may be about 0.06Ω to about 0.15Ω.

Any suitable method for evaluation of corrosion characteristics may be used. For example, an optical adhesive may be stacked on a polarizer plate. Then, the optical adhesive may be kept at 35° C. for 3-5 days for curing, and a polarizer plate having the cured optical adhesive stacked thereon may be prepared. Next, two transparent conductive films (including an ITO film or the like) may be stacked on opposite upper sides of the cured optical adhesive, thereby providing a specimen.

Figure 2:
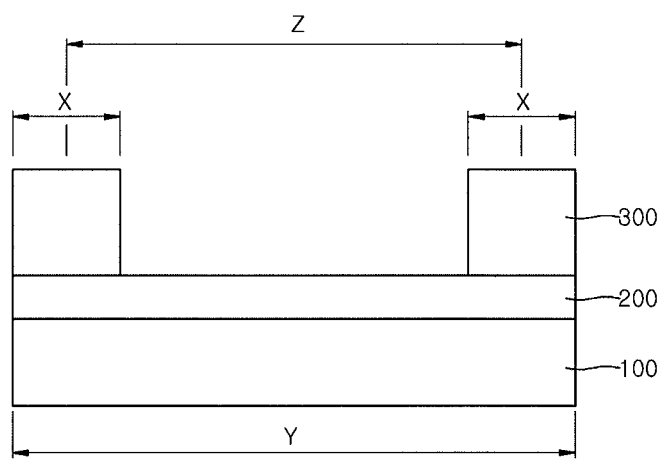
FIG. 2 illustrates a side sectional view of a specimen for evaluation of corrosion, according to an embodiment.

FIG. 2 illustrates a side sectional view of a specimen for evaluation of corrosion, according to an embodiment. Referring to FIG. 2, a cured optical adhesive 200, e.g., an optical adhesive layer, may be stacked on the polarizer plate 100, and two transparent conductive films 300 (including an ITO film or the like) may be stacked on opposite upper sides of the cured optical adhesive 200. The optical adhesive layer stacked on the polarizer plate may have a total length Y of 7 cm. Each of the two ITO films 300 stacked on opposite upper sides of the optical adhesive layer may have a length X of 1 cm, and a length Z for measurement of surface resistance may be 6 cm.

A resistance tester may be connected to the respective ITO films 300 stacked on the opposite upper sides of the optical adhesive layer or the cured optical adhesive 200, to measure an initial surface resistance Rs1. Then, the specimen may be kept at 70° C. and 95% RH for 48 hours, followed by measurement of a surface resistance Rs2 by the same method. A corrosion characteristic of the optical adhesive layer may be evaluated based on a surface resistance difference Rs2−Rs1.

In an implementation, the specimen may have a surface resistance difference Rs3−Rs1 of less than about 0.2Ω, where Rs3 is a surface resistance of the specimen comprising the optical adhesive layer kept at 60° C. and 95% RH for 500 hours.

For example, first, the specimen may be prepared as in the aforementioned method, followed by measuring the initial surface resistance Rs1 of the specimen. Then, the specimen may be kept at 60° C. and 95% RH for 500 hours, followed by measurement of the surface resistance Rs3 of the specimen. The corrosion characteristic of the optical adhesive layer may be evaluated based on the surface resistance difference Rs3−Rs1. The optical adhesive layer may make a surface resistance difference Rs3−Rs1 be less than about 0.2Ω. In an implementation, the surface resistance difference Rs3−Rs1 may be about 0.06Ω to about 0.15Ω.

In an implementation, the optical adhesive layer may have an index of refraction of about 1.48 to about 1.50, as measured as a film having a thickness of about 10 μm to 50 μm.

The index of refraction may affect optical characteristics of the optical adhesive, e.g., visibility, light leakage, or the like. One type of optical adhesive layer may have an index of refraction of about 1.46. The optical adhesive layer with such an index of refraction may reduce the size of a region in which light leakage occurs. However, a display apparatus including the optical adhesive layer may not ensure a consistent determination result in failure testing, because it may be changed according to a viewing angle, due to difficulty in distinguishing the region undergoing light leakage and a region free from light leakage, thereby causing process difficulty upon application of optical adhesives. In addition, light leakage of the display apparatus may be roughly proportional to the size of the display apparatus (e.g., size effect).

According to the embodiments, the optical adhesive layer may have an index of refraction of about 1.48 to about 1.50. As a result, the optical adhesive layer according to an embodiment may facilitate identification of light leakage while reducing and/or preventing light leakage, thereby facilitating process design and improving light uniformity. In an implementation, the optical adhesive layer may have an index of refraction of about 1.48 to about 1.49.

The index of refraction may be measured by a suitable method, e.g., the index of refraction may be measured by a typical method of measuring the index of refraction of a film using an Abbe refractometer. In this method, an optical adhesive film may be prepared by coating an optical adhesive on a release film (e.g., a polyethylene terephthalate film), followed by drying at 90° C. for 4 minutes. Then, by removing the release film from the resultant, the optical adhesive film may be obtained. The optical adhesive film may have a thickness of about 10 μm to about 50 μM, without being limited thereto.

In an implementation, the optical adhesive layer may have a loss modulus G" of about 1.0E+04 to about 2.0E+04 dyne/cm$^2$, as measured at a thickness of 25 μm at 25° C. and 1 Hz. Within this range, the optical adhesive layer may help prevent omission of the optical adhesive. In an implementation, the optical adhesive layer may have a loss modulus of about 1.4E+04 to about 2.0E+04 dyne/cm$^2$.

In an implementation, the optical adhesive layer may have a ratio (G'/G") of storage modulus G' to loss modulus G" of about 1 to about 6, as measured at a thickness of 25 μm at 25° C. and 1 Hz. Within this range, the optical adhesive layer may have improved light leakage characteristics and facilitate clear identification of light leakage. In an implementation, the optical adhesive layer may have a ratio (G'/G") of about 3 to about 5.5.

According to an embodiment, an optical member including the optical adhesive layer as described above may be used.

In an implementation, the optical member may include a transparent conductive film; an optical adhesive layer stacked on the transparent conductive film; and a polarizer plate stacked on the optical adhesive layer.

In an implementation, the optical member may include a transparent conductive film and a polarizer plate stacked via the optical adhesive layer. For example, the optical member may have a structure wherein the optical adhesive layer and the polarizer plate are sequentially stacked on the transparent conductive film. FIG. 1 illustrates a side sectional view of an optical member according to an embodiment. Referring to FIG. 1, an optical adhesive layer 2 and a polarizer plate 3 may be sequentially stacked on a transparent conductive film 1.

In this optical member, the optical adhesive layer may have the surface resistance requirements based on the aforementioned method for evaluating the corrosion characteristic, the index of refraction, G" or G'/G", as described above.

The transparent conductive film may be a film or a grid electrode film (GEF) comprised of at least one selected from the group of tin oxide, indium oxide, indium tin oxide, indium zinc oxide, indium zirconium oxide, zirconium oxide, fluorine tin oxide, zinc oxide, cadmium tin oxide, sulfur oxide, fluorine oxide, carbon black, carbon nanotube, platinum, gold, silver, palladium, electrically conductive polymer, and a mixture thereof, without being limited thereto.

The transparent conductive film may have a thickness of about 50 μm to about 200 μm, without being limited thereto.

A polarizer plate may have a suitable configuration. For example, the polarizer plate may include a polarizing base member formed of polarizing media, and protective films formed on both sides of the polarizing base member.

The polarizing base member may be formed by stretching a polyvinyl alcohol resin film capable of polarizing incident light, and dyeing the resultant with an iodine compound or a dichromatic polarizing material. For example, the polarizing base member may be prepared by stretching a polyvinyl alcohol resin film, such as polyvinyl alcohol, polyvinyl formal, polyvinyl acetal, and ethylene copolymer hydrolysate films, and dyeing the stretched film with iodine or a dichromatic polarizing material.

The protective film may help protect the polarizing base member, and may be a multilayer film prepared by stacking one or more of cellulose films (e.g., triacetyl cellulose films), polycarbonate films, and polyether sulfone films.

The polarizer plate may be stacked on the transparent conductive film by bonding the protective film of the polarizer plate to the optical adhesive layer.

The transparent conductive film may be stacked on a glass substrate or a polyethylene terephthalate (PET) substrate.

The optical adhesive layer may be formed of an optical adhesive. The optical adhesive layer may be formed by coating the optical adhesive or by coating and curing the optical adhesive. A suitable curing method may be used.

The optical adhesive may have a gel fraction of greater than about 55%. In an implementation, the optical adhesive may have a gel fraction of about 70% to about 88%.

The gel fraction may be measured by a suitable method. For example, 1.5 g of an optical adhesive may be dissolved in 20 ml of toluene, kept at 23° C. for 48 hours and dried at 100° C. for 24 hours, followed by measuring a mass (A) of the resultant. The gel fraction of the optical adhesive may be obtained using an initial mass (B) and the mass (A) of the optical adhesive by the following Equation 1:

$$\text{Gel fraction} = (A/B) \times 100$$

In an implementation, the optical adhesive composition may include: a (meth)acrylic copolymer and a curing agent.

The (meth)acrylic copolymer may have an index of refraction of about 1.48 to about 1.50. Within this range, the optical adhesive may have improved light leakage characteristics. The index of refraction may be measured by a suitable method of measuring the index of refraction of a film using an Abbe refractometer.

The (meth)acrylic copolymer may have an acid value of less than about 0.5 mgKOH/g. Within this range, the optical adhesive may provide desired surface hardness while improving corrosion characteristics when applied to a transparent conductive film. In an implementation, the (meth)acrylic copolymer may have an acid value of about 0.15 mgKOH/g to about 0.49 mgKOH/g, e.g., about 0.15 mgKOH/g to about 0.48 mgKOH/g. The acid value may be measured according to JIS K0070 (1992 edition), without being limited thereto.

The (meth)acrylic copolymer may have a weight average molecular weight of about 800,000 g/mol to about 2,000,000 g/mol. Within this range, the (meth)acrylic copolymer may be easily copolymerized. In an implementation, the (meth)acrylic copolymer may have a weight average molecular weight of about 800,000 g/mol to about 1,400,000 g/mol.

The (meth)acrylic copolymer may include repeating units of, e.g., may be a copolymer of a monomer mixture including, a vinyl monomer having an index of refraction of about 1.47 or more. Within this range, the vinyl monomer may help increase the index of refraction of the (meth)acrylic copolymer, thereby facilitating efficient suppression of light leakage. In an implementation, the vinyl monomer may have an index of refraction of about 1.47 to about 1.5.

The vinyl monomer having an index of refraction of about 1.47 or more may be present, e.g., as a repeating unit, in an amount of about 0.01 to about 30 wt % in the (meth)acrylic copolymer. Within this range, the optical adhesive may exhibit good initial peeling strength and durability and may not cause light leakage when applied to middle or small size displays. In an implementation, repeating units of the vinyl monomer may be present in an amount of about 1 to about 30 wt %, e.g., about 10 to about 30 wt %, in the (meth)acrylic copolymer.

The vinyl monomer having an index of refraction of about 1.47 or more may be selected from the group of an aromatic ring containing vinyl monomer, an alicyclic ring containing vinyl monomer, a pyrrolidonyl group containing vinyl monomer, a furyl group containing monomer, and a mixture thereof. In an implementation, the vinyl monomer may be an aromatic ring containing vinyl monomer.

The aromatic ring containing vinyl monomer may have positive birefringence.

In an implementation, the aromatic ring containing vinyl monomer may be a vinyl monomer represented by Formula 1, below.

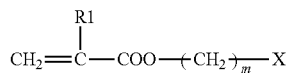

In Formula 1, R1 may be hydrogen or a C1-C5 alkyl group, m may be an integer from 0 to about 10, and X may be selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, and a benzylphenyl group.

In an implementation, the aromatic ring containing vinyl monomer may be a vinyl monomer represented by Formula 2, below.

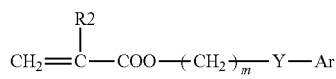

In Formula 2, R2 may be hydrogen or a C1-C5 alkyl group, in may be an integer from 0 to about 10, Y may be oxygen or sulfur, and Ar may be selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, and a benzylphenyl group.

For example, the vinyl monomer represented by Formula 1 or 2 may include at least one selected from the group of phenoxy(meth)acrylate, 2-ethylphenoxy(meth)acrylate, benzyl(meth)acrylate, phenyl(meth)acrylate, 2-ethylthiophenyl (meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl (meth)acrylate, 2-4-methylphenylethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl (meth)acrylate, 2-(4-cyclohexylphenyl)ethyl(meth)acrylate, 2-(2-chlorophenyl)ethyl(meth)acrylate, 2-(3-chlorophenyl) ethyl(meth)acrylate, 2-(4-chlorophenyl)ethyl(meth)acrylate, 2-(4-bromophenyl)ethyl(meth)acrylate, 2-(3-phenylphenyl) ethyl(meth)acrylate, and 2-(4-benzylphenyl)ethyl(meth) acrylate, without being limited thereto.

In an implementation, the aromatic ring containing vinyl monomer may be one selected from phenoxy diethyleneglycol(meth)acrylate, ethylene oxide modified nonylphenol (meth)acrylate, biphenyl(meth)acrylate, styrene, vinyl toluene, alpha-methylstyrene, and hydroxylethylated beta-naphtol(meth)acrylate.

The alicyclic ring containing vinyl monomer may include (meth)acrylic monomers or (meth)acrylic acid esters having a C4 to C20 alicyclic or hetero-alicyclic ring. For example, the alicyclic ring containing vinyl monomer may include cyclopentyl(meth)acrylate, cyclohexyl(meth)acrylate or isobornyl (meth)acrylate, without being limited thereto.

The pyrrolidonyl group containing vinyl monomer may include N-vinylpyrrolidone, without being limited thereto.

The furyl group containing monomer may include a furyl group containing vinyl monomer including furyl(meth)acrylate, tetrahydrofurfuryl(meth)acrylate, and the like, furyl isocyanate, furyl propanoate, or furyl pentanoate, without being limited thereto.

The (meth)acrylic copolymer may include repeating units derived from, e.g., may be a copolymer of, (A) a monomer selected from the aromatic ring containing vinyl monomer, the alicyclic ring containing vinyl monomer, the pyrrolidonyl group containing vinyl monomer, the furyl group containing monomer, and a mixture thereof, (B) an alkyl group containing vinyl monomer, (C) a hydroxyl group containing vinyl monomer, and (D) a carboxylic acid group containing vinyl monomer.

The alkyl group containing vinyl monomer may include a (meth)acrylic acid ester having a C1 to C20 linear or branched alkyl group. For example, the alkyl group containing vinyl monomer may include at least one selected from the group of methyl(meth)acrylate, ethyl(meth)acrylate, propyl(meth) acrylate, n-butyl(meth)acrylate, t-butyl(meth)acrylate, isobutyl(meth)acrylate, pentyl(meth)acrylate, hexyl(meth) acrylate, 2-ethylhexyl(meth)acrylate, heptyl(meth)acrylate, octyl(meth)acrylate, isooctyl(meth)acrylate, nonyl(meth) acrylate, decyl(meth)acrylate, and lauryl(meth)acrylate, without being limited thereto. Repeating units of the alkyl group containing vinyl monomer may be present in an amount of about 50 to about 90 wt % in the (meth)acrylic copolymer. Within this range, coating on the transparent conductive film may be facilitated, and a low curing contraction ratio may be obtained in curing. In an implementation, repeating units of the alkyl group containing vinyl monomer may be present in an amount of about 65 to about 90 wt %.

The hydroxyl group containing vinyl monomer may be a hydroxyl group containing (meth)acrylic acid ester. In an implementation, the hydroxyl group containing (meth) acrylic acid ester may be a C2 to C20 alkyl group or C4 to C20 cycloalkyl group containing (meth)acrylic acid ester that includes at least one hydroxyl group at a terminal or in the structure thereof. For example, the hydroxyl group containing vinyl monomer may include at least one selected from the group of 2-hydroxyethyl(meth)acrylate, 4-hydroxybutyl (meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono (meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth) acrylate, 2-hydroxy-3-phenyloxypropyl(meth)acrylate, 2-hydroxy-3-phenyloxy(meth)acrylate, 4-hydroxycyclohexyl(meth)acrylate, cyclohexane dimethanol mono(meth) acrylate, and allyl alcohol, without being limited thereto. Repeating units of the hydroxyl group containing (meth)

acrylic acid ester may be present in an amount of about 0.1 to about 20 wt % in the (meth)acrylic copolymer. Within this range of the hydroxyl group containing (meth)acrylic acid ester, coating on the ITO film may be facilitated and a low curing contraction ratio may be obtained. In an implementation, repeating units of the hydroxyl group containing (meth) acrylic acid ester may be present in an amount of about 0.5 to about 10 wt % in the (meth)acrylic copolymer.

The carboxylic acid group containing vinyl monomer may be a C1 to C10 (meth)acrylic acid ester that includes at least one carboxylic acid group at a terminal or in the structure thereof, or a carboxylic acid containing a vinyl group. For example, the carboxylic acid group containing vinyl monomer may include at least one selected from the group of 2-carboxyethyl(meth)acrylate, 3-carboxypropyl(meth)acrylate, (meth)acrylic acid, itaconic acid, crotonic acid, maleic acid, fumaric acid, and maleic anhydride, without being limited thereto. Repeating units of the carboxylic acid group containing vinyl monomer may be present in an amount of about 0.1 to about 4.9 wt % in the (meth)acrylic copolymer. Within this range, coating on the ITO film may be facilitated and a low curing contraction ratio may be obtained. In an implementation, repeating units of the carboxylic acid group containing vinyl monomer may be present in an amount of about 0.1 to about 1.0 wt %, e.g., about 0.5 to about 1.0 wt %.

The (meth)acrylic copolymer may be prepared by adding a polymerization initiator to a mixture of the vinyl monomer having an index of refraction of about 1.47 or more, the hydroxyl group containing vinyl monomer, the alkyl group containing vinyl monomer and the carboxylic acid group containing vinyl monomer, followed by polymerization under proper conditions.

The polymerization initiator may include at least one or two compounds selected from the group of 2,2-azobis(2,4-dimethylvaleronitrile), azobisisobutyronitrile, benzoyl peroxide, dilauroyl peroxide, tert-butyl-(2-ethylhexyl) monoperoxycarbonate, tert-amyl-(2-ethylhexyl) monoperoxycarbonate, 1,1-di(tert-butylperoxy)cyclohexane, 1,1-di(tert-amylperoxy)cyclohexane, tert-butylperoxy-3,5,5-trimethylhexanoate, 1,1-di(tert-butylperoxy)-3,3,5-trimethylcyclohexane, potassium persulfate, sodium persulfate, ammonium persulfate, and azo-based water soluble initiators, without being limited thereto.

The initiator may be present in an amount of about 0.001 to about 2 parts by weight, based on 100 parts by weight of the alkyl group containing vinyl monomer.

In preparation of the (meth)acrylic copolymer, a solvent capable of dissolving the vinyl monomer having an index of refraction of about 1.47 or more, the hydroxyl group containing vinyl monomer, the alkyl group containing vinyl monomer and the carboxyl group containing vinyl monomer may be used. A suitable solvent, e.g., ethyl acetate, may be used.

Temperature and time for polymerization may be suitably adjusted. For example, polymerization may be carried out at about 65 to about 70° C. for about 6 to about 8 hours.

The curing agent may be a heat curing agent. For example, the curing agent may include isocyanate, epoxy, aziridine, melamine, amine, imide, carbodiimide, amide curing agents, or a mixture thereof, without being limited thereto.

In an implementation, in the optical adhesive, the curing agent may be a mixture of an isocyanate curing agent and an epoxy curing agent. For example, the mixture may include about 90 to about 99 wt % of the isocyanate curing agent and about 1 to about 10 wt % of the epoxy curing agent. In an implementation, the mixture may include about 90 to about 95 wt % of the isocyanate curing agent and about 5 to about 10 wt % of the epoxy curing agent.

A suitable isocyanate heat curing agent may be used. For example, the isocyanate heat curing agent may include toluene diisocyanate, 2,4-trilene diisocyanate, 2,6-trilene diisocyanate, hydrogenated trilene diisocyanate, isoform diisocyanate, 1,3-xylene diisocyanate, 1,4-xylene diisocyanate, diphenylmethane-4,4-diisocyanate, 1,3-bisisocyanatomethyl cyclohexane, tetramethyl xylene diisocyanate, 1,5-naphtalene diisocyanate, hexamethylene diisocyanate, 2,2,4-trimethyl hexamethylene diisocyanate, 2,4,4-trimethyl hexamethylene diisocyanate, methylolpropane modified toluene diisocyanate, an adduct of trilene diisocyanate and trimethylolpropane, an adduct of xylene diisocyanate and trimethylolpropane, triphenylmethane triisocyanate, methylene bistriisocyanate, polyols (trimethylolpropane) thereof, or a mixture thereof.

Any suitable epoxy curing agent may be used. For example, the epoxy curing agent may include ethylene glycol diglycidyl ether, triglycidyl ether, trimethylolpropane triglycidyl ether, N,N,N',N'-tetraglycidyl ethylenediamine, glycerine diglycidylether, or a mixture thereof.

In the optical adhesive, the curing agent may be present in an amount of about 0.01 to about 10 parts by weight, based on 100 parts by weight of the (meth)acrylic copolymer. Within this range, the optical adhesive may have good adhesion and stabilized processability. In an implementation, the curing agent may be present in an amount of about 0.1 to about 5 parts by weight, e.g., about 0.1 to about 1 part by weight.

The optical adhesive may further include a silane coupling agent. The silane coupling agent may help improve stability and reliability in adhesion of the optical adhesive.

A suitable silane coupling agent may be used. For example, the silane coupling agent may include at least one selected from the group of polymerizable unsaturated group containing silicon compounds, such as vinyltrimethoxysilane, vinyltriethoxysilane, (meth)acryloxypropyltrimethoxysilane, and (meth)acryloxypropyltriethoxysilane; silicon compounds having an epoxy structure, such as 3-glycidoxypropyltrimethoxysilane, 3-glycidoxypropylmethyldimethoxysilane, 3-glycidoxypropyltriethoxysilane, and 2-(3,4-epoxycyclohexyl)ethyltrimethoxysilane; amino group containing silicon compounds, such as 3-aminopropyltrimethoxysilane, 3-aminopropyltriethoxysilane, N-(2-aminoethyl)-3-aminopropyltrimethoxysilane, and N-(2-aminoethyl)-3-aminopropylmethyldimethoxysilane; and 3-chloropropyltrimethoxysilane, 3-isocyanatepropyltriethoxysilane, gamma-acetoacetatepropyl trimethoxysilane, without being limited thereto.

The silane coupling agent may be present in an amount of about 0.01 to about 0.5 parts by weight, based on 100 parts by weight of the (meth)acrylic copolymer. Within this range, the optical adhesive may further improve stability and reliability in adhesion, while improving storage modulus of the (meth)acrylic copolymer.

A display apparatus according to an embodiment may include the optical adhesive layer or the optical member. For example, in the display apparatus, the optical adhesive layer may be used for adhesion between a cover window and an ITO substrate, or between a polarizer plate and a substrate. In an implementation, the display apparatus may include the optical member that has an optical adhesive and a polarizer plate sequentially stacked on a transparent conductive film.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION EXAMPLE 1

Preparation of (Meth)Acrylic Copolymer

To a 1 L 4-neck flask, 59 parts by weight of butyl acrylate (BA), 10 parts by weight of methyl acrylate (MA), 0.5 parts by weight of 2-hydroxyethyl acrylate (2-HEMA), 30 parts by weight of phenoxy methacrylate (PMA) and 0.5 parts by weight of acrylic acid (AA) were placed together with 10 parts by weight of ethyl acetate (EA) as a solvent, and were maintained at 65° C. As an initiator, 0.03 parts by weight of azobisisobutyronitrile diluted with ethyl acetate in a ratio of 50% was supplied to the mixture. By reaction at 65° C. for 5 hours, a (meth)acrylic copolymer was prepared. During the reaction, nitrogen was supplied at 10 cc/min to the flask. The index of refraction of the prepared (meth)acrylic copolymer was measured by a typical method of measuring the index of refraction of a film using an Abbe refractometer index of refraction. The acid value of the prepared (meth)acrylic copolymer was measured according to JIS K0070 (1992 Edition). The weight average molecular weight, index of refraction and acid value of the prepared (meth)acrylic copolymer are provided in Table 1, below.

PREPARATION EXAMPLES 2 to 5

Preparation of (Meth)Acrylic Copolymer

The (meth)acrylic copolymers were prepared by the same method as in Preparation Example 1 except for the contents (unit: parts by weight) of the respective components, as shown in Table 1.

TABLE 1

|  |  | Preparation Example 1 | Preparation Example 2 | Preparation Example 3 | Preparation Example 4 | Preparation Example 5 |
|---|---|---|---|---|---|---|
| Monomer (A) | PMA | 30 | 20 | 10 | 0 | 20 |
| Monomer (B) | BA | 59 | 68.8 | 78.5 | 89 | 64.5 |
|  | MA | 10 | 10 | 10 | 10 | 10 |
| Monomer (C) | 2-HEMA | 0.5 | 0.5 | 0.5 | 0.5 | 0.5 |
| Monomer (D) | AA | 0.5 | 0.7 | 1.0 | 0.5 | 5.0 |
| Weight average molecular weight (g/mol, $10^4$) |  | 80 | 110 | 140 | 80 | 80 |
| Index of refraction |  | 1.48 | 1.48 | 1.48 | 1.46 | 1.48 |
| Acid value (mgKOH/g) (Solution) |  | 0.15 | 0.25 | 0.48 | 0.15 | 1.5 |

Details of components used in the Examples and Comparative Examples were as follows.

(1) (Meth)acrylic copolymer: (meth)acrylic copolymer of Preparation Examples 1 to 5

(2) Curing agent 1: trimethylolpropane modified toluene diisocyanate (Coronate-L, Nippon Polyurethane)

Curing agent 2: Epoxy cross-linking agent (TETRAD-C, Mitsubishigano)

(3) Silane coupling agent: 3-glycidoxypropyltrimethoxysilane (KBM-403, Shin-Etsu Chemical)

EXAMPLES 1 TO 3 AND COMPARATIVE EXAMPLES 1 AND 2

Preparation of Optical Adhesive

Each optical adhesive was prepared by mixing components as listed by Table 2, below, (unit: parts by weight) without a solvent, followed by stirring the mixture for 1 hour.

TABLE 2

|  |  | Example | | | Comparative Example | |
|---|---|---|---|---|---|---|
|  |  | 1 | 2 | 3 | 1 | 2 |
| (Meth)acrylic copolymer | Preparation Example 1 | 100 | — | — | — | — |
|  | Preparation Example 2 | — | 100 | — | — | — |
|  | Preparation Example 3 | — | — | 100 | — | — |
|  | Preparation Example 4 | — | — | — | 100 | — |
|  | Preparation Example 5 | — | — | — | — | 100 |
| Curing agent 1 |  | 0.25 | 0.25 | 0.25 | 0.25 | 0.25 |
| Curing agent 2 |  | 0.02 | 0.02 | 0.02 | 0.02 | 0.02 |
| Silane coupling agent |  | 0.06 | 0.06 | 0.06 | 0.06 | 0.06 |

The properties of the respective prepared optical adhesives were evaluated as follows and the results are shown in Table 3, below.

(1) Corrosion characteristics: The prepared adhesive was coated to a thickness of 20~30 μm on a polarizer plate. Then, the coated adhesive layer was kept at 35° C. for 5 days for curing, and two ITO films were stacked on opposite upper sides of the cured adhesive layer, thereby providing a specimen as shown in FIG. 2. The specimen of the cured adhesive layer stacked on the polarizer plate had a total length Y of 7 cm, and each of the ITO films stacked on opposite upper sides of the cured adhesive layer had a length X of 1 cm, and a length Z for measurement of surface resistance was 6 cm. With a resistance tester (Mutimeter, FLUKE) connected to the respective ITO films, a resistance Rs1 of the ITO films was measured using a 2-point probe. Then, the specimen was kept at 70° C. and 95% RH for 48 hours, followed by measurement of a surface resistance Rs2 by the same method. Corrosion characteristics were evaluated based on a surface resistance difference Rs2−Rs1. By the same method, a surface resistance Rs3 of the specimen was measured after storage at 60° C. and 95% RH for 500 hours. The corrosion characteristics were evaluated based on a surface resistance difference Rs3−Rs1.

(2) Index of refraction: The optical adhesive was coated on a polyethylene terephthalate release film, followed by drying at 90° C. for 4 minutes, thereby providing a sample including an optical adhesive film. After removing the release film from the sample, the index of refraction of a 20 μm thick optical adhesive film was measured using an Abbe refractometer (DR-A1).

Figure 3:
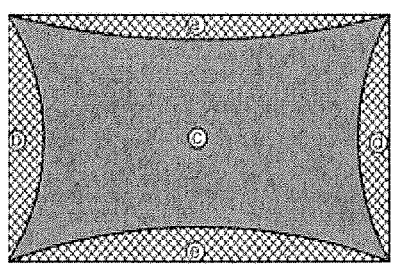
FIG. 3 illustrates a side sectional view of a specimen for evaluation of light leakage, according to an embodiment.

(3) Light leakage: After operating an LCD device, brightness of the front side of the display panel based on the specimen used for the light transmission uniformity testing below was measured at a height of 1 m using a brightness tester (RISA, Hiland). Specifically, brightness (c) at the central region of the display panel and brightness (a), (b), (d) and (e) at corners of the display panel were measured. As shown in FIG. 3, each brightness measuring point was placed at the middle of each side of the panel. Here, each side of the panel adjoined the circumference of a circle for brightness measurement, which had a radius of 0.5 cm. In FIG. 3, ⓐ, ⓑ, ⓒ, ⓓ, and ⓔ indicate brightness measurement points. The brightness difference ΔL was calculated according to the following Equation 2. A lower ΔL value means better light leakage characteristics.

$$\Delta L = [(a+b+d+e)/4] - c \qquad \text{<Equation 2>}$$

(where a, b, d and e are brightness measured at brightness measuring points of FIG. 3, and c is brightness at the center before reliability testing)

(4) Adhesive creep (μm): Each of the polarizing plates having the adhesives of the Examples and the Comparative Examples was attached to a glass substrate with an adhesion area of 1.5×1.5 cm. After storage at room temperature for 3 days to prepare a specimen, creep was evaluated by measuring displacement distance (μm) when a force of 2.2 kgf was applied to the specimen for 20 minutes, using a universal testing machine (UTM).

(5) Light transmission uniformity: A light leakage portion was observed using a backlight unit in a dark room. The coated polarizer plates (100×175 mm) were attached to both sides of a glass substrate (400×200×15 mm), such that optical axes of the polarizing plates crossed each other. For evaluation of light transmission uniformity, the specimen was kept at 80° C. for 250 hours or at 60° C. and 90% RH for 250 hours, followed by storage at 25° C. for 1 hour or more. Evaluation standards were as follows.

○: Difficult to determine non-uniformity of light transmission with naked eye

Δ: Slightly non-uniform light transmission x: Non-uniform light transmission (6) Durability: Each of the polarizing plates (100 mm×175 mm) having the adhesives prepared in the Examples and the Comparative Examples was attached to both sides of a glass substrate, followed by application of a force 4-5 kg/cm², thereby providing a specimen. Here, the specimen was prepared in a clean room to prevent generation of bubbles or foreign matter. The prepared specimens were kept at 80° C. for 500 hours to evaluate heat resistance according to generation of bubbles or peeling. Further, the specimens were kept at 60° C. and 90% RH for 500 hours to evaluate humid heat resistance according to generation of bubbles or peeling. Immediately after storage at 25° C. for 1 hour, the specimens were observed with the naked eye or under a microscope. Evaluation standards were as follows.

○: No bubbles or peeling

Δ: Slight occurrence of bubbles or peeling x: Prominent occurrence of bubbles or peeling (7) Reworkability/cutability: A 400×250 mm polarizing plate coated with each of the adhesives prepared in the Examples and the Comparative Examples was cut using a Thomson cutter, followed by observing the cut cross-section of the adhesive layer. Then, with the polarizing plates attached to both sides of a glass substrate, a pressure of 4-5 kg/cm² was applied to prepare a specimen. After storage at 70° C. for 6 hours and slow cooling to room temperature for over 1 hour, reworking was carried out. The presence or absence of adhesive residues on the glass substrate was observed. Evaluation standards were as follows.

○: No adhesive residues on cut cross-section (No transfer during rework)

Δ: Slight adhesive residues on cut cross-section (Slight transfer during rework)

x: Prominent adhesive residues on cut cross-section (Transfer occurred during rework)

(8) Rheology: A 20~25 μm NCF specimen was prepared, followed by aging at 35° C. for 96 hours. Then, each of the 25 μm thick optical adhesive layers prepared in the Examples and the Comparative Examples was stacked to prepare a 300 μm thick specimen. The specimen was stacked on a 8 mm diameter disk, followed by measurement of rheology. G' and G" were measured under conditions of 25° C. and 1 Hz using a Physica MCR501 (Anton Parr Co., Ltd.).

(9) Omission of adhesives: A 400×250 mm polarizing plate coated with each of the adhesives prepared in the Examples and the Comparative Examples was cut using a Thomson cutter. 30 sheets of polarizer plates were placed on an adhesive omission tester, and subjected at one end thereof to impact at 120 cycles. The cut cross-section of the adhesive layer was observed under a microscope to identify omission of the adhesive according to the number of damaged polarizer plates.

○: 5 or less damaged polarizer plate and good adhesive omission characteristic

Δ: 6 to 9 damaged polarizer plates and slight omission of adhesive x: 10 or more damaged polarizer plate and prominent omission of adhesive

TABLE 3

|  |  | Example 1 | Example 2 | Example 3 | Comparative Example 1 | Comparative Example 2 |
|---|---|---|---|---|---|---|
| Corrosion characteristic (Ω) | 70° C., 95%, 48 hours | 0.08 | 0.12 | 0.15 | 0.07 | 0.4 |
|  | 60° C., 95%, 500 hours | 0.06 | 0.08 | 0.14 | 0.08 | 0.6 |
| Index of refraction |  | 1.48 | 1.48 | 1.48 | 1.46 | 1.48 |
| Light leakage |  | 0.25 | 0.25 | 0.28 | 0.42 | 0.25 |
| Adhesive creep (μm) |  | 0.362 | 0.328 | 0.306 | 0.354 | 0.367 |
| Light transmission uniformity |  | ○ | ○ | ○ | ○ | ○ |
| Durability | Heat resistance | ○ | ○ | ○ | ○ | ○ |
|  | Humid heat resistance | Δ | ○ | ○ | X | ○ |
| Cutability/reworkability |  | ○ | ○ | ○ | Δ | X |
| Rheology | G'(dyne/cm², 25° C., 1 Hz) | 8.51E+04 | 6.58E+04 | 9.11E+04 | 1.33E+05 | 1.33E+05 |
|  | G''(dyne/cm², 25° C., 1 Hz) | 1.89E+04 | 1.45E+04 | 1.69E+04 | 2.15E+04 | 2.12E+04 |
| Omission of adhesive |  | ○ | ○ | ○ | X | X |

As shown in Table 3, it may be seen that the optical adhesive according to the Examples had low corrosion, improved light leakage characteristics, low G'', and did not exhibit omission of the adhesives.

By way of summation and review, modulus of an optical adhesive may regulated to adjust stress, as a method for suppressing light leakage. However, this method has a limit in suppression of light leakage. For example, some techniques may not allow a consistent determination result in failure testing, which may be changed according to a viewing angle due to difficulty in distinguishing a region undergoing light leakage and a region free from light leakage, thereby causing process difficulty upon application of an optical adhesive. In addition, light leakage of some display apparatuses may be roughly proportional to the size of the display apparatus.

A technique for coupling a polarizer plate to a transparent conductive film including an ITO film and the like may provide an improved display apparatus. However, an optical adhesive for coupling the polarizer plate and the ITO film may cause corrosion of the ITO film, thereby deteriorating usability of the display apparatus.

The embodiments provide an optical adhesive that helps prevent corrosion of an ITO film, thereby enhancing usability of a display apparatus.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An optical member, comprising:
a transparent conductive film;
an optical adhesive layer on the transparent conductive film; and
a polarizer plate stacked on the optical adhesive layer,
wherein a surface resistance difference Rs2−Rs1 of a specimen including the optical adhesive layer is less than about 0.2Ω, the specimen being prepared by manufacturing the polarizer plate having the optical adhesive layer thereon and stacking two transparent conductive films on opposite upper sides of the optical adhesive layer, where Rs1 is an initial surface resistance of the specimen and Rs2 is a surface resistance of the specimen kept at 70° C. and 95% RH for 48 hours, and
wherein the optical adhesive layer includes a (meth)acrylic copolymer, the (meth)acrylic copolymer including about 0.01 to about 30 wt % of repeating units of an aromatic ring containing vinyl monomer, an alicyclic ring containing vinyl monomer, a pyrrolidonyl group containing vinyl monomer, a furyl group containing monomer, or a mixture thereof.

2. The optical member as claimed in claim 1, wherein a surface resistance difference Rs3−Rs1 of the specimen is less than about 0.2Ω, where Rs3 is a surface resistance of the specimen kept at 60° C. and 95% RH for 500 hours.

3. The optical member as claimed in claim 1, wherein the optical adhesive layer has an index of refraction of about 1.48 to about 1.50, as measured on a film having a thickness of about 10 μm to about 50 μm.

4. The optical member as claimed in claim 1, wherein the optical adhesive layer has a loss modulus G'' of about 1.0E+04 to about 2.0E+04 dyne/cm², as measured at a thickness of 25 μm at 25° C. and 1 Hz.

5. The optical member as claimed in claim 1, wherein the optical adhesive layer has a ratio (G'/G'') of storage modulus G' to loss modulus G'' of about 1 to about 6, as measured at a thickness of 25 μm at 25° C. and 1 Hz.

6. The optical member as claimed in claim 1, wherein the (meth)acrylic copolymer has an acid value of less than about 0.5 mgKOH/g and a weight average molecular weight of about 800,000 to about 2,000,000 g/mol.

7. The optical member as claimed in claim 1, wherein the monomer has an index of refraction of about 1.47 or more.

8. The optical member as claimed in claim 1, wherein the copolymer includes the repeating units of the aromatic ring containing vinyl monomer, the aromatic ring containing vinyl monomer being represented by Formula 1 or 2:

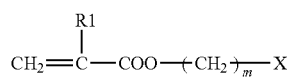

<Formula 1> wherein, in Formula 1, R1 is hydrogen or a C1-C5 alkyl group, m is an integer from about 0 to 10, and X is a phenyl group, a methylphenyl group, a methylethylphenyl group, a methoxyphenyl group, a propylphenyl group, a cyclohexylphenyl group, a chlorophenyl group, a bromophenyl group, a phenylphenyl group, or a benzylphenyl group,

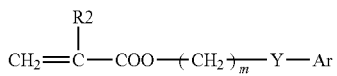

<Formula 2> wherein, in Formula 2, R2 is hydrogen or a C1-C5 alkyl group, m is an integer from about 0 to 10, Y is oxygen or sulfur, and Ar is a phenyl group, a methylphenyl group, a methylethylphenyl group, a methoxyphenyl group, a propylphenyl group, a cyclohexylphenyl group, a chlorophenyl group, a bromophenyl group, a phenylphenyl group, or a benzylphenyl group.

9. The optical member as claimed in claim 1, wherein the (meth)acrylic copolymer includes:
   the repeating units of (A) the aromatic ring containing vinyl monomer, the alicyclic ring containing vinyl monomer, the pyrrolidonyl group containing vinyl monomer, the furyl group containing monomer, or the mixture thereof,
   repeating units of (B) an alkyl group containing vinyl monomer,
   repeating units of (C) a hydroxyl group containing vinyl monomer, and
   repeating units of (D) a carboxylic acid group containing vinyl monomer.

10. The optical member as claimed in claim 9, wherein the repeating units of the (D) monomer are present in an amount of about 0.1 to about 4.9 wt % in the (meth)acrylic copolymer.

11. The optical member as claimed in claim 9, wherein the (meth)acrylic copolymer includes the about 0.01 to about 30 wt % of repeating units of the (A) monomer, about 50 to about 90 wt % of the repeating units of the (B) monomer, about 0.1 to about 20 wt % of the repeating units of the (C) monomer, and about 0.1 to about 4.9 wt % of the repeating units of the (D) monomer.

12. The optical member as claimed in claim 1, wherein the optical adhesive layer further includes an isocyanate curing agent or an epoxy curing agent.

13. The optical member as claimed in claim 12, wherein the curing agent is present in an amount of about 0.01 to about 10 parts by weight, based on 100 parts by weight of the (meth)acrylic copolymer.

14. The optical member as claimed in claim 1, wherein the optical adhesive layer further includes a silane coupling agent, the silane coupling agent being present in an amount of about 0.01 to about 0.5 parts by weight, based on 100 parts by weight of the (meth)acrylic copolymer.

15. The optical member as claimed in claim 1, wherein the transparent conductive film is a film or a grid electrode film including tin oxide, indium oxide, indium tin oxide, indium zinc oxide, indium zirconium oxide, zirconium oxide, fluorine tin oxide, zinc oxide, cadmium tin oxide, sulfur oxide, fluorine oxide, carbon black, carbon nanotube, platinum, gold, silver, palladium, electrically conductive polymer, or a mixture thereof.

16. The optical member as claimed in claim 1, wherein the transparent conductive film is stacked on a glass substrate or a polyethylene terephthalate (PET) substrate.

17. An optical adhesive comprising a (meth)acrylic copolymer,
   wherein the optical adhesive has an index of refraction from about 1.48 to about 1.50, as measured on a film having a thickness of about 10 μm to 50 μm,
   wherein a surface resistance difference Rs2−Rs1 of a specimen including the optical adhesive is less than about 0.2Ω, the specimen being prepared by manufacturing a polarizer plate having a cured product of the optical adhesive thereon and stacking two transparent conductive films on opposite upper sides of the cured product, where Rs1 is an initial surface resistance of the specimen and Rs2 is a surface resistance of the specimen kept at 70° C. and 95% RH for 48 hours, and
   wherein the optical adhesive layer includes a (meth)acrylic copolymer, the (meth)acrylic copolymer including about 0.01 to about 30 wt % of repeating units of an aromatic ring containing vinyl monomer, an alicyclic ring containing vinyl monomer, a pyrrolidonyl group containing vinyl monomer, a furyl group containing monomer, or a mixture thereof.

18. A display apparatus comprising the optical member as claimed in claim 1.

* * * * *